(12) United States Patent
Covelli et al.

(10) Patent No.: US 9,171,436 B1
(45) Date of Patent: Oct. 27, 2015

(54) VISUAL DISTRESS SIGNAL DEVICE

(71) Applicants: Anthony W. Covelli, La Costa, CA (US); Robert B. Simons, Jr., San Diego, CA (US)

(72) Inventors: Anthony W. Covelli, La Costa, CA (US); Robert B. Simons, Jr., San Diego, CA (US)

(73) Assignee: Sirius Signal, San Diego, CA (US)

( * ) Notice: Subject to any disclaimer, the term of this patent is extended or adjusted under 35 U.S.C. 154(b) by 0 days.

(21) Appl. No.: 14/561,197

(22) Filed: Dec. 4, 2014

Related U.S. Application Data

(63) Continuation-in-part of application No. 29/493,224, filed on Jun. 6, 2014, now Pat. No. Des. 720,247.

(51) Int. Cl.
| | |
|---|---|
| *G08B 5/22* | (2006.01) |
| *B60Q 1/26* | (2006.01) |
| *B60Q 1/00* | (2006.01) |
| *F21S 4/00* | (2006.01) |
| *B63C 9/00* | (2006.01) |
| *G08B 5/36* | (2006.01) |
| *B63B 45/04* | (2006.01) |
| *B63B 49/00* | (2006.01) |
| *B63B 51/04* | (2006.01) |
| *G01S 5/02* | (2010.01) |

(52) U.S. Cl.
CPC . *G08B 5/36* (2013.01); *B63B 45/04* (2013.01); *B63B 49/00* (2013.01); *B63B 51/04* (2013.01); *G01S 5/0231* (2013.01)

(58) Field of Classification Search
CPC ....... B63B 49/00; B63B 45/04; G01S 5/0231; F21Y 2111/001; F21Y 2101/02; F21V 5/04; F21V 7/0091; F21V 7/0075; G02B 19/0028; G02B 19/0061; G02B 19/0071; G02B 27/0977; H01L 33/58; H01L 33/60; F21L 4/00; B63C 9/20; F21S 9/02
USPC .............. 340/815.45, 984, 539.13, 573.6, 340/471–473; 342/357.09, 357.1, 357.14, 342/386; 362/227, 259, 237, 184, 327, 307, 362/800; 441/6, 11, 13, 17, 18
See application file for complete search history.

(56) References Cited

U.S. PATENT DOCUMENTS

| | | | | |
|---|---|---|---|---|
| 4,560,356 | A * | 12/1985 | Burr | 441/80 |
| 7,320,631 | B1 * | 1/2008 | Distefano et al. | 441/16 |
| 2004/0012962 | A1 * | 1/2004 | Wolf | 362/259 |
| 2007/0241887 | A1 * | 10/2007 | Bertagna et al. | 340/539.13 |
| 2008/0247161 | A1 * | 10/2008 | Hulsey et al. | 362/227 |
| 2010/0026571 | A1 * | 2/2010 | Batty | 342/357.09 |
| 2011/0075409 | A1 * | 3/2011 | Zheng | 362/231 |
| 2011/0122609 | A1 * | 5/2011 | Dahlin | 362/184 |

* cited by examiner

*Primary Examiner* — Mirza Alam
(74) *Attorney, Agent, or Firm* — Richard D. Clarke

(57) ABSTRACT

The present invention is directed to a Visual Distress Signal Device that will float vertically and provides a high-intensity pattern of light which incorporates both a radially symmetrical and omni directional/beam electrically-powered, LED light emitting electronic visual distress signaling device (eVDSD) incorporating a GPS transmitter that can interface with the internet using a cell phone adaptor to enable mobile handheld smartphone application (apps) devices to alert and locate vessels and persons in distress. This device can be used as a replacement for pyrotechnic flares utilized in search and rescue of vessels and persons in distress, especially in a marine environment.

22 Claims, 10 Drawing Sheets

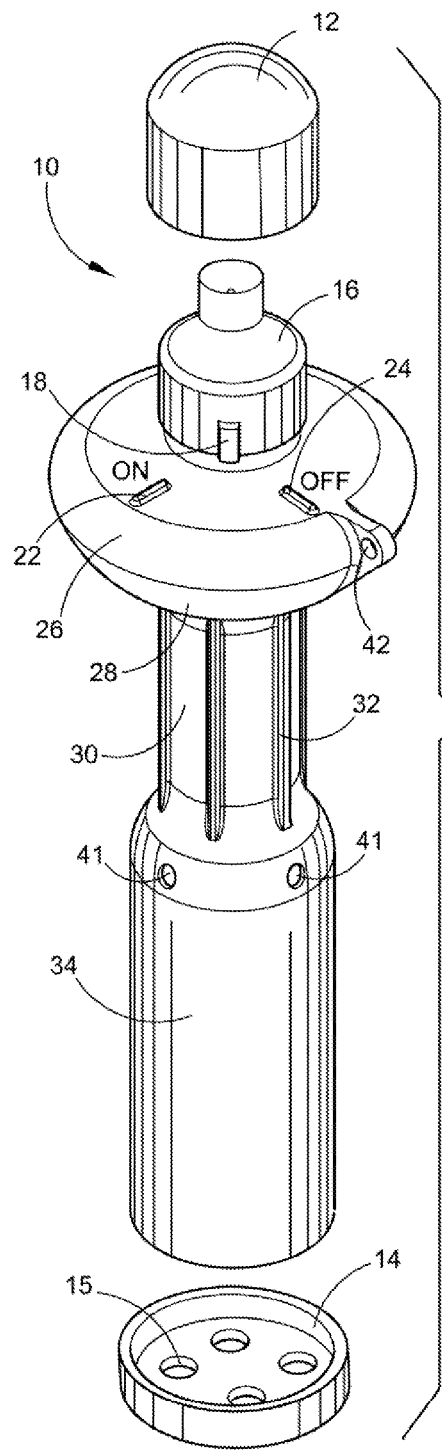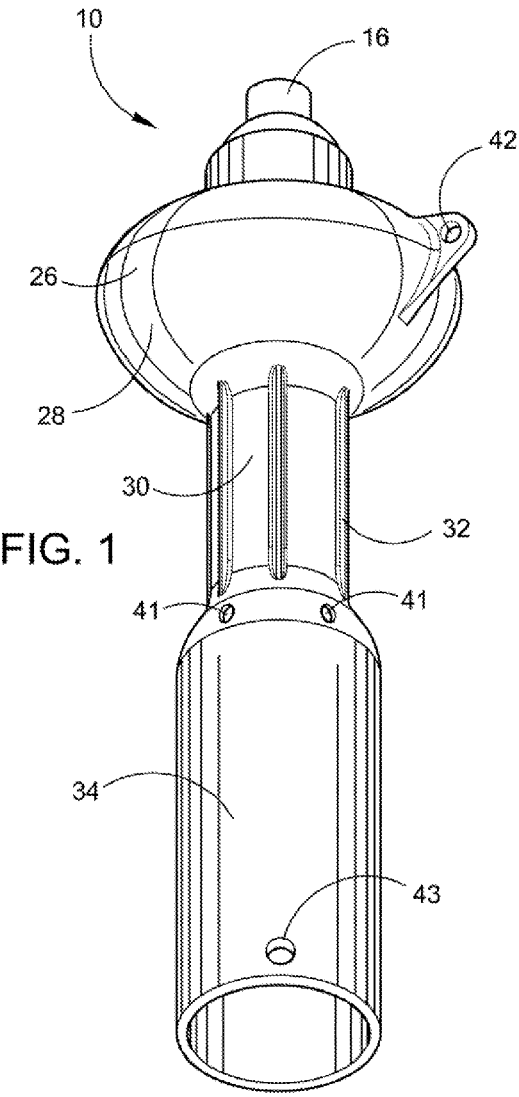
FIG. 1
FIG. 2

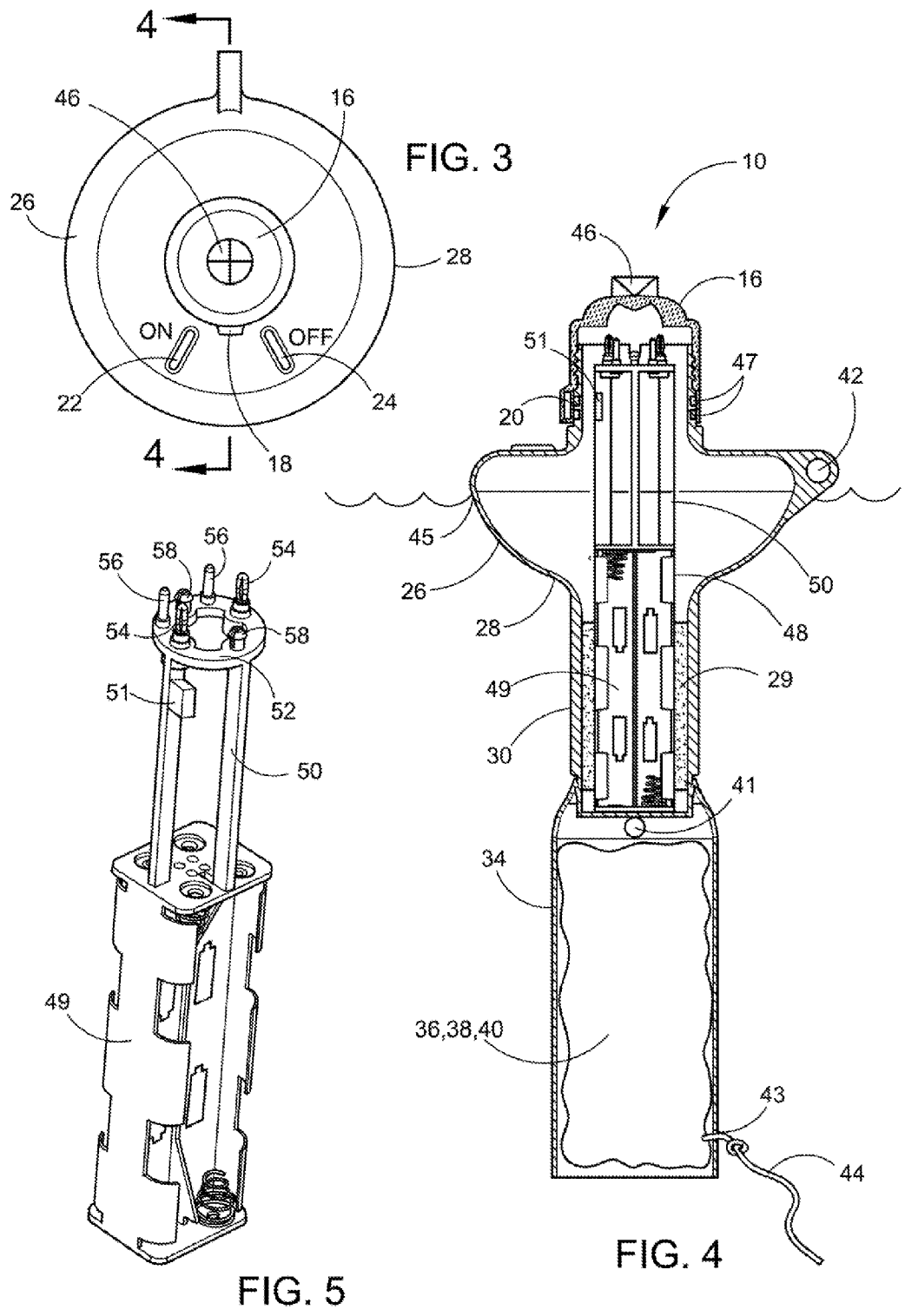

VISUAL DISTRESS SIGNAL DEVICE

FIELD OF THE INVENTION

This application relates to devices used in search and rescue of vessels and persons in distress, especially in a marine environment. More particularly, the present application provides a high-intensity pattern of light which incorporates both a radially symmetrical and omni directional/beam electrically-powered, LED light emitting electronic visual distress signaling device (eVDSD) incorporating a GPS transmitter that can interface with the internet using a cell phone adaptor to enable mobile handheld smartphone application (apps) devices to alert and locate vessels and persons in distress. This device can be used as a replacement for pyrotechnic flares utilized in search and rescue of vessels and persons in distress, especially in a marine environment.

BACKGROUND OF THE INVENTION

A vast assortment of signaling lights, including search and rescue devices for the use on vessels in distress, have been used for many years. The use of pyrotechnic flares has been in the past the most commonly used for distress signal devices. Pyrotechnic flares are exceptionally dangerous because they can easily burn the people using them, they can start the vessels on fire if there is a fuel leak and they can even burn under water creating additional problems. Moreover, one cannot overemphasize the potential environmental disaster of flare disposal. Over the next three years it is estimated that approximately 30 million flares will be disposed of improperly or illegally.

The Coast Guard's Research, Development, Test and Evaluation (RDT&E) program is working on more than 80 projects that support Coast Guard requirements across all mission areas. The RDT&E program is comprised of the Office of RDT&E at Coast Guard Headquarters in Washington, D.C., and the Research and Development Center (RDC) at New London, Conn. The RDC is the Coast Guard's sole facility performing applied RDT&E experimentation and demonstrations.

The RDT&E program pursues technologies that provide incremental improvements as well as those with the greatest potential to strategically transform the way the Coast Guard does business.

The RDT&E program leverages partnerships with academia, other government agencies and private industry, to proactively anticipate and research solutions to future technological challenges.

Search and Rescue Distress Notification Methods and Alternatives by the United States Coast Guard reviewed pyrotechnic flares that are commonly used by mariners to signal distress. Flares have drawbacks and present significant storage and disposal problems. The RDC was sought to determine appropriate criteria to evaluate light emitting diode (LED) or other light signals as potential maritime distress signals.

The project team selected a group of LED, flashtube (strobe) and incandescent-based devices to obtain photometric data. An understanding of the physical and perceptual aspects of these devices allowed the project team to select a subset of devices for further evaluation.

Following the lab tests, the project team designed and conducted two field demonstrations. The first demonstration assessed individual devices to determine the most effective signal characteristics based on detectable range, ability to attract attention and ability to distinguish the signal against background lighting. A second demonstration used a subset of the devices to compare the most effective characteristics, head-to-head. Finally, a separate evaluation looked at device ergonomics to help understand the physical aspects of the devices that would make them easier to use.

This project was to determine suitability of potential alternatives to pyrotechnic visual distress signals by.

Evaluating the effectiveness of presently available LED (and other) devices as Visual Distress Signal Devices.

Reviewing functional requirements for visual distress signals.

Investigating and reporting on device characteristics and evaluating them against existing pyrotechnic standards.

Investigating and reporting on "experimental" or "developmental" technologies and evaluating them against pyrotechnic standards.

Determining the most effective light-signal characteristics for alternative Visual Distress Signal Devices.

Additionally, this project will produce recommendations for future non-pyrotechnic requirements and applications. Recommendations will address the feasibility of whether non-pyrotechnic devices could replace pyrotechnics as alert, locate and/or marker devices. Alert and locate specifications for the signal lights differ in the varying peak intensity and the focal height of the LED emitted light, which can be altered by manually adjusting the distance between the LED and the optics.

Numerous innovations for the Visual Distress Signal Device have been provided in the prior art that are described as follows. Even though these innovations may be suitable for the specific individual purposes to which they address, they differ from the present design as hereinafter contrasted.

The following is a summary of those prior art patents most relevant to this application at hand, as well as a description outlining the difference between the features of the Visual Distress Signal Device and the prior art.

U.S. Pat. No. 7,153,002 of Jin Jong Kim describes a lens for light emitting diode (LED) light sources which allows light emitted from an LED light source to exit the lens in a direction perpendicular to a vertical center axis of the lens. The lens of the present invention includes an inner space which is defined in a lens body having both a bottom surface and an upper reflective surface, so that light passing through the inner space is partially reflected by total internal reflection on a portion (selective transmission surface, inner reflective surface, inside reflective surface) of a boundary surface between the inner space and the lens body. Thus, light emitted from an LED light source efficiently exits the lens through a side surface. Accordingly, the lens of the present invention is used in efficient display and illumination of optical systems.

This patent describes a light emitting diode (LED) light sources which allows light emitted from an LED light source to exit the lens in a direction perpendicular to a vertical center axis of the lens used in display and illumination optical systems. This lens does not have the same internal structure and it only describes LED light source exiting the lens in a direction perpendicular to a vertical center axis of the lens. It does not address the value of a portion of the light to be directed vertically or describe the other unique features of the Visual Distress Signal Device.

U.S. Pat. No. 6,679,621 of Robert S. West et al. describes a lens that comprises a bottom surface, a reflecting surface, a first refracting surface obliquely angled with respect to a central axis of the lens, and a second refracting surface extending as a smooth curve from the bottom surface to the first refracting surface. Light entering the lens through the bottom surface and directly incident on the reflecting surface is reflected from the reflecting surface to the first refracting surface and refracted by the first refracting surface to exit the lens in a direction substantially perpendicular to the central axis of the lens. Light entering the lens through the bottom surface and directly incident on the second refracting surface is refracted by the second refracting surface to exit the lens in a direction substantially perpendicular to the central axis of the lens. The lens may be advantageously employed with LEDs, for example, to provide side-emitting light-emitting devices. A lens cap attachable to a lens is also provided.

This patent describes a side-emitting light-emitting lens that does not have the same internal structure and again does not address the value of a portion of the light to be directed vertically or describe the other unique features of the Visual Distress Signal Device.

U.S. Pat. No. 6,607,286 of Robert S. West et al. describes a lens mounted to a light emitting diode package internally redirects light within the lens so that a majority of light is emitted from the lens approximately perpendicular to a package axis of the light emitting diode package. In one embodiment, the light emitted by the light emitting diode package is refracted by a saw tooth portion of the lens and reflected by a total internal reflection portion of the lens.

This patent describes another side-emitting light-emitting lens that does not have the same internal structure and again does not address the value of a portion of the light to be directed vertically or describe the other unique features of the Visual Distress Signal Device.

U.S. Pat. No. 6,598,998 of Robert S. West et al. describes a lens mounted to a light emitting diode package internally redirects light within the lens so that a majority of light is emitted from the lens approximately perpendicular to a package axis of the light emitting diode package. In one embodiment, the light emitted by the light emitting diode package is refracted by a saw tooth portion of the lens and reflected by a total internal reflection portion of the lens.

This patent describes another side-emitting light-emitting lens that does not have the same internal structure and again does not address the value of a portion of the light to be directed vertically or describe the other unique features of the Visual Distress Signal Device.

U.S. Pat. No. 2,492,837 of Eugene Briggs describes an electronically operated signal lights and more particularly to a portable light of the flashing type adapted for emergency or signal use.

This patent describes a self-contained portable flashing light of the gaseous discharge type energized by a battery that has not been designed to be used in a marine environment and does not float in the water.

U.S. Pat. No. 5,034,847 of John E. Brain describes a portable light beacon for use on life rafts and the like that has a long life due to a flashing light allowing the battery to recharge and a water sensing switch that once wet remains on. The light beacon comprises a portable battery power source in a water proof container, a flashing light with watertight electrical connections between the flashing light and the power source, and a fluid sensing switch comprising a fluid absorbent composition positioned between two terminals with circuitry to activate the flashing light when an electrical conductive fluid has been absorbed by the fluid absorbent composition to provide an electrical path between the two terminals.

This patent describes a hand held light beacon for use on life rafts and the like that has a long life due to a flashing light but does not have the lens capability of horizontal or vertical light directing and has not been designed to float vertically or be tied by a lanyard lifted to the top of a mast.

U.S. Pat. No. 7,182,479 of John f. Flood et al. describes a portable, hand-held, electrically powered, high intensity directed light beam generating device for use as a replacement for a pyrotechnic flare for search and rescue, especially in a marine environment. The light intensity is generated by a xenon strobe flash tube in a covered, mirror reflective housing that allows for a directional beam of light of less than 6 steradians. The limited radiation light direction provides a safe optical solution for the user to prevent eye damage while increasing the beam intensity and range. The light and illumination section surrounding the strobe flash tube includes thermally conductive paths for the heat generated by the flash tube to be transmitted to the outside of the housing.

This patent describes a hand held electrically powered, high intensity directed light beam generating device but does not have the unique lens capability nor does it float in the water and if you let go of it would sink.

U.S. Pat. No. 7,703,950 of Jurgen E. Ewert et al. describes a side-emitting lens for use with an LED lamp provides a distribution of emitted light that is substantially normal to an axis of symmetry of the lens; the light can also be symmetrical with respect to a plane normal to the lens axis. The lens has a cavity in which the LED lamp can reside, having a cavity refracting surface with a central section and a stepped cavity sidewall. The lens also has a base external refracting surface surrounding the cavity, an internal reflecting surface spaced apart from the cavity, and a side surface; these surfaces redirect light that enters the lens through the cavity refracting surface. For many applications, the lens axis is vertical in service and the lens is configured to provide a narrow distribution of light in the horizontal plane.

This patent describes only a side-emitting lens for an LED lamp having a base section with a cavity defined by a cavity refracting surface with a substantially planar central section, which is substantially normal to the central lens axis, and a stepped cavity sidewall having a series of sidewall refracting surfaces, and a base external refracting surface symmetrically disposed about the central lens axis and spaced apart from said stepped cavity sidewall. The Visual Distress Signal Device lens does not have the stepped cavity sidewall but has a concave inner surface while having drain capability of the conical upper cavity. The application additionally provides the complete structure of the Visual Distress Signal Device and its unique floating capabilities.

U.S. Pat. No. 8,702,256 of Hans Poul Alkaer relates to an emergency light device for marine use comprising a housing accommodating an electronic circuit, at least one transparent dome, and a first and a second housing member, said electronic circuit comprising at least one light emitting diode provided in the one transparent dome, an electrical power supply comprising at least one battery of the AA, AAA or AAAA type, and at least one operating switch, said emergency light characterized in that the housing has a width which is substantially larger than the height, preferably the width is at least double or triple the height.

This patent describes a light for a life jacket that would sink if it were dropped in the water and does not provides the complete structure of the Visual Distress Signal Device and its unique floating capabilities.

U.S. Pat. No. 6,805,467 of Edward A. Wolf describes a portable emergency light for long range detection by flight and marine search and rescue personnel which utilizes a battery-powered laser array mounted and sealed within a waterproof housing to increase the effective intensity of a specific class laser. The laser array includes a plurality of laser light generators mounted together to project substantially along a common optical axis producing a signaling light. The search and rescue light may include a rotatable head for directing the signaling lights along a 360 degree plane and a three-dimensional gimbal which maintains the light beams in a level horizontal position so that the signaling lights may be easily projected along the entire horizon relative to the user. Each laser light generator is within US Government safety standards for the specific class laser despite the increased power of the signal. The laser array can be used with optical alignment lenses to form a desired highly visible light pattern.

This patent describes an emergency laser array signal light that utilizes a battery-powered laser array mounted and sealed within a waterproof housing to increase the effective intensity of a specific class laser but does not have any floating capability.

In this respect, before explaining at least one embodiment of the Visual Distress Signal Device in detail it is to be understood that the design is not limited in its application to the details of construction and to the arrangement, of the components set forth in the following description or illustrated in the drawings. The Visual Distress Signal Device is capable of other embodiments and of being practiced and carried out in various ways. In addition, it is to be understood that the phraseology and terminology employed herein are for the purpose of description and should not be regarded as limiting.

SUMMARY OF THE INVENTION

The principle advantage of the Visual Distress Signal Device is to be used to locate marine vessels and or persons in distress, with a high-intensity portable LED signaling light that is compliant within current and future published governmental regulations for devices utilized in search and rescue operations.

Another advantage of this Visual Distress Signal Device to provide a LED signaling device that eliminates the use of pyrotechnic flares especially in marine environment.

Another advantage of this Visual Distress Signal Device is that the primary light source is not only directed in a horizontal plane, for radial symmetry, but a portion is directed vertically through a transitional angle of divergence between horizontal and vertical planes.

Another advantage of the Visual Distress Signal Device is that it has one or more intermittent LED lights that can be provided in varying colors and can replicate one or more preprogrammed approved distress signal flash sequences such as an SOS signal or other defined flash patterns.

Another advantage of the Visual Distress Signal Device is changes to the vertical position of the LED changes the aiming direction of the beam from both the first and second parts of the lens. This allows the peak intensity of the lens to be varied as needed for specific applications. Raising the position of the LED within the lens will lower the beam angle from the first section of the lens and raise the beam angle from the second total internal reflection (TIR) section of the lens. So this allows the total beam angle to be widened or split into 2 beams if desired. This is particularly helpful in switching from the alert to the locate signal status during a search and rescue operation.

Another advantage of this Visual Distress Signal Device to provide a LED signaling device that eliminates the problems of storage and disposal of old or damaged pyrotechnic flares.

Another advantage of the Visual Distress Signal Device is to provide a very high-intensity portable light signaling device that is safe for the user in any environment.

Another advantage of the Visual Distress Signal Device is that it will float in an upright position.

Another advantage of the Visual Distress Signal Device is that in a lower compartment it can house either a die marker, a Coast Guard approved distress flag or a non-pyrotechnic smoke generating device.

Another advantage of the Visual Distress Signal Device is that the conical central element of the lens has a means to drain water that collects in the center.

Yet another advantage of the Visual Distress Signal Device is being portable, floatable and can be hoisted aloft for optimal visual range and effectiveness and also be tethered to the vessel, a life raft or person in the water. Additionally, with the flag or dye marker removed from the chamber housing same, a pole or boat hook can be inserted into the empty chamber to elevate the device. In this regard, the lower chamber is sized for display in a standard cup holders or fishing rod holders commonly found on most boats.

The Visual Distress Signal Device provides a high-intensity, radially symmetrical, omni directional beam electrically-powered, LED light generating signal locating device for use as a replacement of pyrotechnic flares.

The Visual Distress Signal Device has a lens with a conical upper reflective cavity with the capability to drain any moisture out to the side by the means of one or more vertical slits or one or more slanting drain holes at the bottom of the conical cavity. The device also incorporates a snap on lower section to house either a die marker, or an internationally recognized distress signaling flag used to aid search and rescue personnel or a non-pyrotechnic smoke generating device. The LED's timing and control of the pulsating flashes is electronically controlled by electrical circuitry that will use a programmable microprocessor.

The marine application includes a waterproof housing with sealing O-rings employing an exterior magnet on the optical lens cap which will be rotated for activation of the LED light reed switch without compromising the housing structure.

The light intensity distribution generated by the Visual Distress Signal Device is greater than 75 candelas in the horizontal plane and greater than 15 candelas along the vertical axis. The light is generated by one or more pulsating light emitting diodes (LEDs) and is distributed by three distinct sections of an optical lens. Light entering the first section of the lens is refracted through the outer lens surface into the horizontal plane. Light entering the second section of the lens is refracted toward a total internal reflection (TIR) feature, which then reflects light toward the horizontal plane. Light entering the third section of the lens, directly above the LED, is allowed to pass through the inner and outer surfaces relatively unaffected, thus maintaining its original direction toward the vertical axis. The unit is powered by one or more batteries, preferably lithium or alkaline batteries.

A feature of the Visual Distress Signal Device is that changes to the vertical position of the LED changes the aiming direction of the beam from both the first and second parts of the lens. This allows the peak intensity of the lens to be varied as needed for specific applications. Raising the position of the LED within the lens will lower the beam angle from the first section of the lens and raise the beam angle from the second total internal reflection (TIR) section of the lens. So this allows the total beam angle to be widened or split into 2 beams if desired.

The operational instructions for the Visual Distress Signal Device are:
   Snap the lower compartment to the upper housing.
   Insert batteries in battery holder board assembly.
   Place supplied EDPM O-ring seals in grooves below thread group on upper housing.

Insert complete battery holder board assembly in opening of upper assembly. Lower into place, rotate to align board for proper switch operation position.

Thread optical lens cap on upper housing clockwise until it bottoms out. Magnet will line up with the word "ON" and the device will be operating. Rotate lens cap counterclockwise to the word "OFF" Your device is now at the ready. A third setting for "TEST" is also anticipated, as well as a battery strength signal switch, for when the light is tested and the batteries checked with turning on the light.

When the magnetically activated reed switch is first turned on to power the circuit pass element, in this example the MOSFET Q1 is turned on. The current through the LED and inductor ramps up until the current through the current sensor element matches the reference. Then pass element, in this example a MOSFET Q1 is turned off and an inductor L1 continues to supply the current through zener D3 until its stored energy is exhausted. After some delay, the MOSFET Q1 is turned on again and the cycle repeats. This cycle repeats during the time the light source is intended to be on and effectively generates the maximum light with the most efficient use of the battery power. Various patterns can be constructed by turning this cycle on and off. For example an S-O-S pattern for a marine beacon. Other color combinations are anticipated, such as cyan-cyan-cyan, red/orange-red/orange-red/orange and numerous other combinations of these colors, chosen from all wavelengths of the visible light spectrum, with white LED emitted light mixed in.

The foregoing has outlined rather broadly the more pertinent and important features of the present Visual Distress Signal Device in order that the detailed description of the application that follows may be better understood so that the present contribution to the art may be more fully appreciated. Additional features of the design will be described hereinafter which form the subject of the claims of this disclosure. It should be appreciated by those skilled in the art that the conception and the disclosed specific embodiment may be readily utilized as a basis for modifying or designing other structures and methods for carrying out the same purposes of the present design. It should also be realized by those skilled in the art that such equivalent constructions and methods do not depart from the spirit and scope of this application as set forth in the appended claims.

BRIEF DESCRIPTION OF THE DRAWINGS

The accompanying drawings, which are incorporated in and form a part of this specification, illustrate embodiments of the Visual Distress Signal Device and together with the detailed description, serve to explain the principles of this application.

FIG. 1 depicts a perspective of the Visual Distress Signal Device with the protective lens cap and bottom drain cap.

FIG. 2 depicts a perspective of the Visual Distress Signal Device.

FIG. 3 depicts a top view of the Visual Distress Signal Device.

FIG. 4 depicts a cross section of the Visual Distress Signal Device illustrating the transparent lens, the location of the battery tray/circuit board perch assembly within the water tight outer housing and the snap on storage compartment that can house a Coast Guard approved distress flag or dye marker or a non-pyrotechnic smoke generating device.

FIG. 5 depicts a perspective view of the battery tray/circuit board perch assembly.

Figure 6:
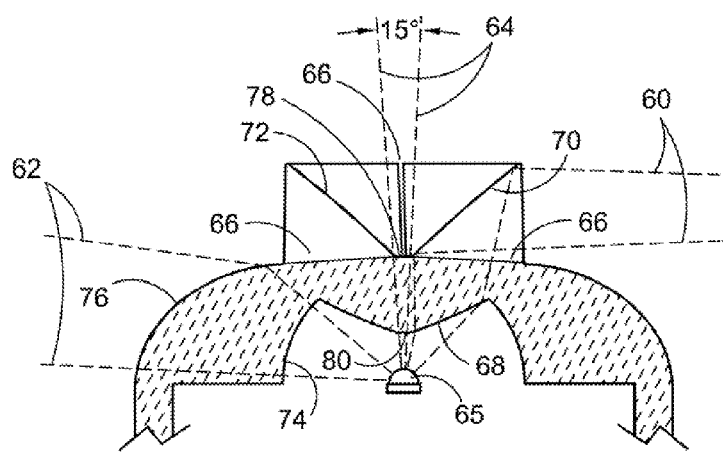
FIG. 6 depicts a cross section through the upper portion of the lens defining the transparent and reflective surfaces and the drain slots.

For a fuller understanding of the nature and advantages of the Visual Distress Signal Device, reference should be had to the following detailed description taken in conjunction with the accompanying drawings which are incorporated in and form a part of this specification, illustrate embodiments of the design and together with the description, serve to explain the principles of this application.

DETAILED DESCRIPTION OF THE PREFERRED EMBODIMENTS

Referring now to the drawings, wherein similar parts of the Visual Distress Signal Device 10A and 10B are identified by like reference numerals, there is seen in FIG. 1 a perspective of the Visual Distress Signal Device 10A with the protective lens cover 12 and a bottom cap 14 with drain orifices 15. This view illustrates the transparent lens 16 with the magnet protrusion 18 and the on and off positioning indicators 22 and 24 on the bulbous top portion 26 of the water tight light housing 28 above the cylindrical grip portion 30 with nonslip ribs 32. The removable snap-on lower compartment 34 has orifices 41 on the top surface to allow air to escape or water to get in to maintain the vertical positioning of the device. The Visual Distress Signal Device is specifically configured and designed to float with the same characteristics with or without the lower chamber attached. Thus, the lower chamber is optional.

FIG. 2 depicts a perspective of the Visual Distress Signal Device 10A illustrating the location of the upper lanyard attachment orifice 42 attached to the bulbous top portion 26, the cylindrical grip portion 30 having nonslip ribs 32 and the snap on storage compartment 34 with the distress flag lanyard orifice 43 on the lower edge.

FIG. 3 depicts a top view of the Visual Distress Signal Device 10A illustrating the conical upper surface 46 of the transparent lens 16 with the magnet protrusion 18. The ON and OFF positioning indicators 22 and 24 are on the bulbous top portion 26 of the water tight light housing 28.

FIG. 4 depicts a cross section of the Visual Distress Signal Device 10A illustrating the transparent lens 16, with the two O-ring seals 47, and the location of the battery tray/circuit board perch assembly 48 within the water tight light housing 28. The bottom of the battery tray/circuit board perch assembly 48 is incased with a soft cushioning material 29 within the cylindrical grip portion 30. The water line 45 is shown along the bulbous top portion 26 of the water tight light housing 28. The battery tray/circuit board perch assembly 48 is shown with the battery compartment 49 and the extended perch legs 50 with the electronic reed switch 51 attached. The extended perch legs 50 are connected to the circuit board mounting plate 52. The snap-on storage compartment 34 shown with a flag lanyard orifice 43, can house a Coast Guard approved distress flag 36, a dye marker pack 38 or a non-pyrotechnic smoke generating device 40.

FIG. 5 a perspective view of the battery tray/circuit board perch assembly 48 illustrating the battery compartment 49 and the extended perch legs 50 with the electronic reed switch 51 attached is shown connected to the circuit board mounting plate 52. The circuit board mounting plate 52 has on the upper surface two banana plugs 54, two alignment pins 56 and two snap-on couplings 58.

FIG. 6 depicts a cross section through the upper section of the transparent lens 16 defining the drain slots 66 and the general positioning of the ray patterns 60, 62 and 64 vertically and three hundred and sixty degrees through the transparent lens 16 from the LED light 65. The inner lens surface 68 directs light onto the upper internal reflection surface 70 of the conical segment 72, forming the light in a ray pattern 60 toward the horizon. The rays are not all perfectly parallel due to the faceted outer surface to add a bit of spread to the beam to help improve the tolerance due to manufacturing variations. The ray pattern 62 is directed through the inner concave surface 74 and in a horizontal direction through the outer convex surface 76 of the transparent lens 16 while the ray pattern 64 is directed at approximately fifteen degrees through the two flat surfaces 78 and 80 in the transparent lens 16 in a vertical direction. This image is from a real ray trace of a polar array of collimated beams put through the transparent lens 16.

Figure 7:
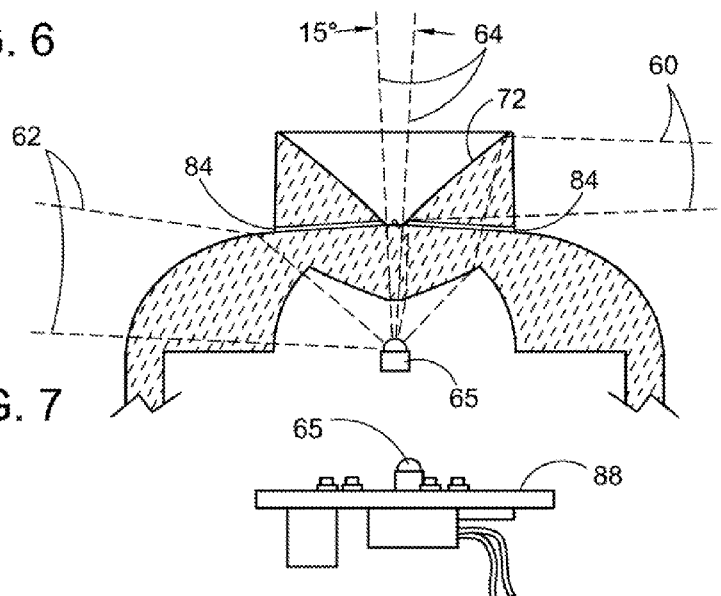
FIG. 7 depicts a cross section through the upper portion of the lens defining the transparent and reflective surfaces and the drain holes.

FIG. 7 depicts a cross section through the upper section of the transparent lens 16 defining the light ray patterns 60, 62 and 64 and reflection surface 70 of the conical segment 72. The alternate embodiment of the transparent lens 16 will have a plurality of drain holes 84 slanting to the lower circumference of the conical segment 72 to drain water from the conical segment 72.

Figure 8:
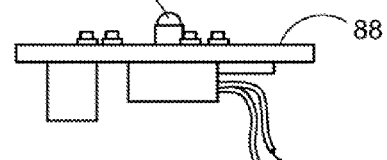
FIG. 8 depicts a side view of the circuit board with a single LED.

FIG. 8 depicts a side view of the circuit board 88 with a single LED light 65.

Figure 9:
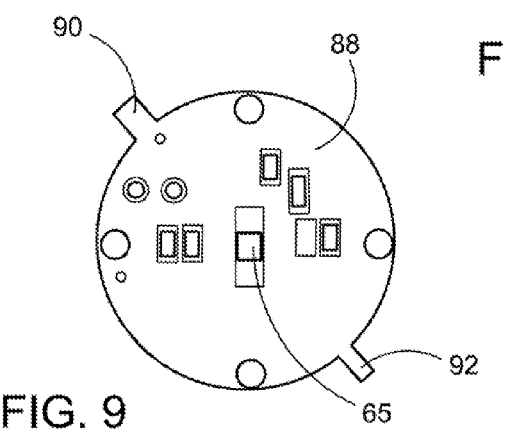
FIG. 9 depicts a top view of the circuit board with a single LED.

FIG. 9 depicts a top view of the circuit board 88 with a single LED light 65 with the large alignment tab 90 and the small alignment tab 92. Four holes in the circuit board 88 align to secure the circuit board 88 to the circuit board mounting plate. Electrical connectivity is made from the battery pack to the circuit board with two banana pins. Alignment tabs 90 and 92 on the board 88 allow the board 88 to be indexed to the upper watertight housing 28.

Figure 10:
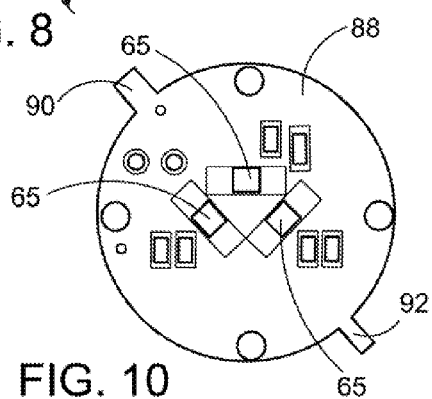
FIG. 10 depicts a top view of the circuit board with one or more (in this case) three LED's, where the placement of the multiple LED's is crucial for optimal operation of the Visual Distress Signal Light.

FIG. 10 depicts a top view of the circuit board 88 with a three LED's lights 65 and the large alignment tab 90 and the small alignment tab 92.

Figure 11:
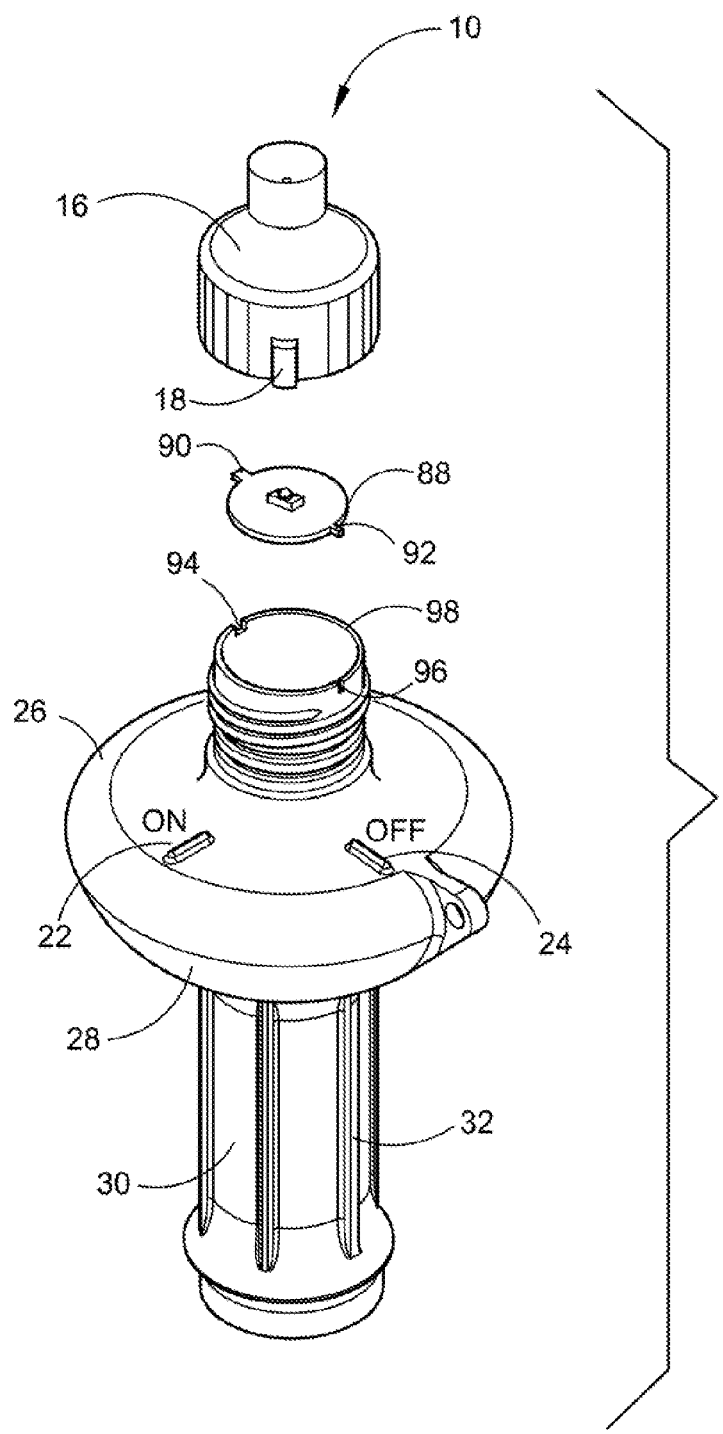
FIG. 11 depicts an exploded perspective view of the Visual Distress Signal Device illustrating locating slots for the battery tray/circuit board perch assembly in the rim of the water tight outer housing and the mating tabs on the sides of the circuit board.

FIG. 11 depicts an exploded perspective view of the Visual Distress Signal Device 10A illustrating the large alignment slot 94 and small alignment slot 96 for the positioning of the battery tray/circuit board perch assembly 48 (shown in FIG. 4). The slots are in the outer rim 98 of the water tight light housing 28 for the mating of the large alignment tab 90 and the small alignment tab 92 on the circuit board 88 in relation to the electronic reed switch 51 (shown in FIG. 4).

Figure 12:
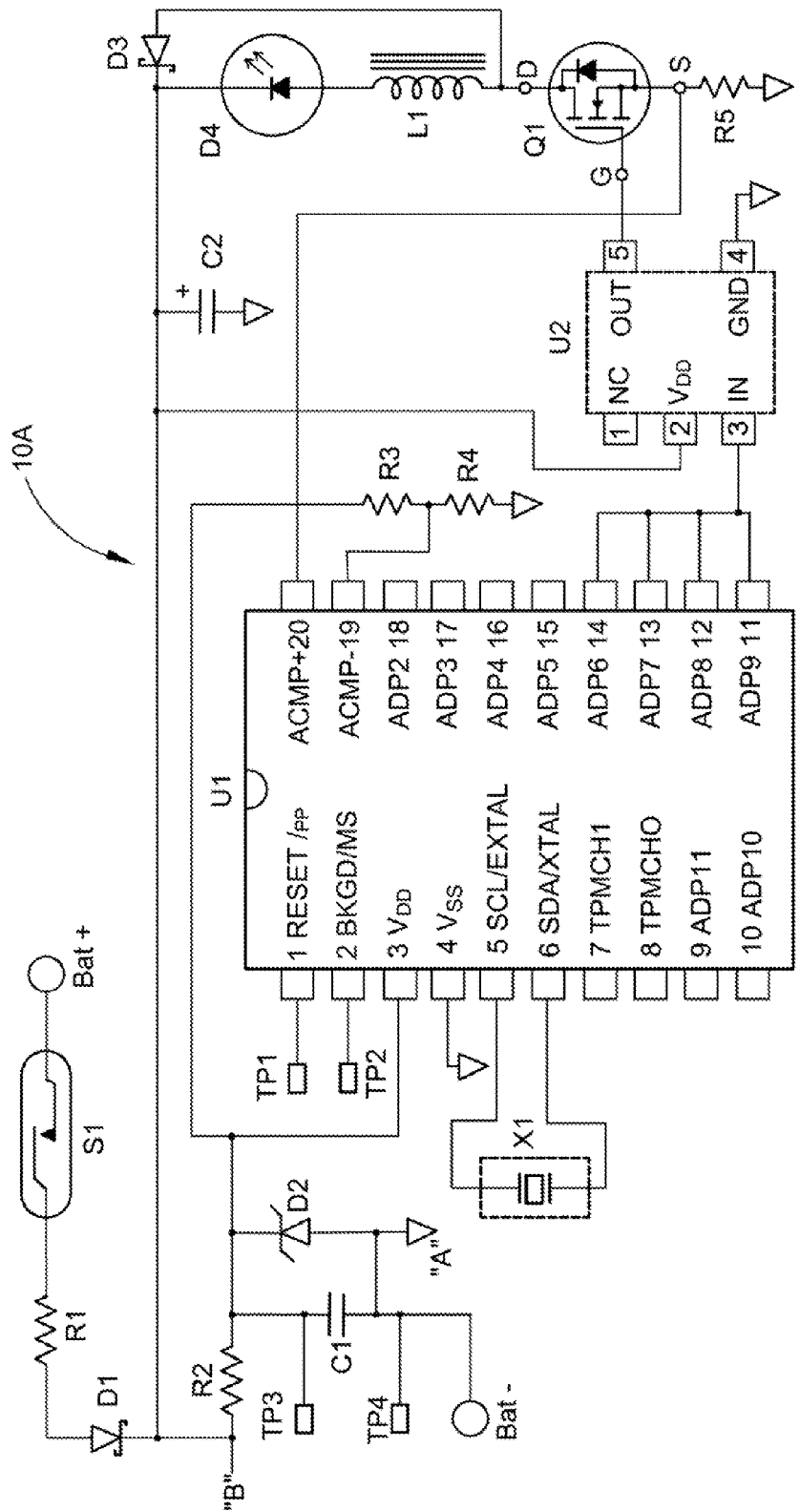
FIG. 12 depicts a schematic with a single LED.

FIG. 12 depicts a schematic for Visual Distress Signal Device 10A with a single LED (D4), that details that the circuit is controlled by a microcontroller or processor (U1) that is controlled by software. The circuit is energized by a power source supplied to Bat+ and Bat−. The circuit has inputs TP1 through TP4 that enable "In circuit programming". The power source is controlled by reed switch (S1). R1 acts to limit the inrush current going to the storage capacitor (C2). Reverse power source protection is provided by (D1). Since the power source can be variable, the zener (D2) regulates the voltage supplying power to the microcontroller (U1). Frequency control is provided by a crystal (X1) in this example, but can be provided by any frequency regulating device. The output of the microprocessor controls a pass element, in this example a MOSFET (Q1), which is driven by a MOSFET Driver (U2). This pass element allows current to flow through a light emitting source, in this example an LED (D4), an inductor (L1), and a current sense element, in this example, a resistor (R5). When Q1 is turned on, the current builds up a magnetic field in the inductor (L1) storing energy. When Q1 is turned off, inductor (L1) supplies current through D3, continuing to power the LED (D4), until the field in inductor (L1) collapses.

The microcontroller senses the current, in this example by using an internal comparator (ACMP+ and ACMP−) to compare the voltage across R5 that represents the current, to a voltage supplied by a reference, in this example a voltage provided by a voltage divider R3 and R4. This controls the peak current. Points "A" and "B" are for wiring an alternate electronic switch to the reed switch shown and described above (see FIG. 19).

Figure 13:
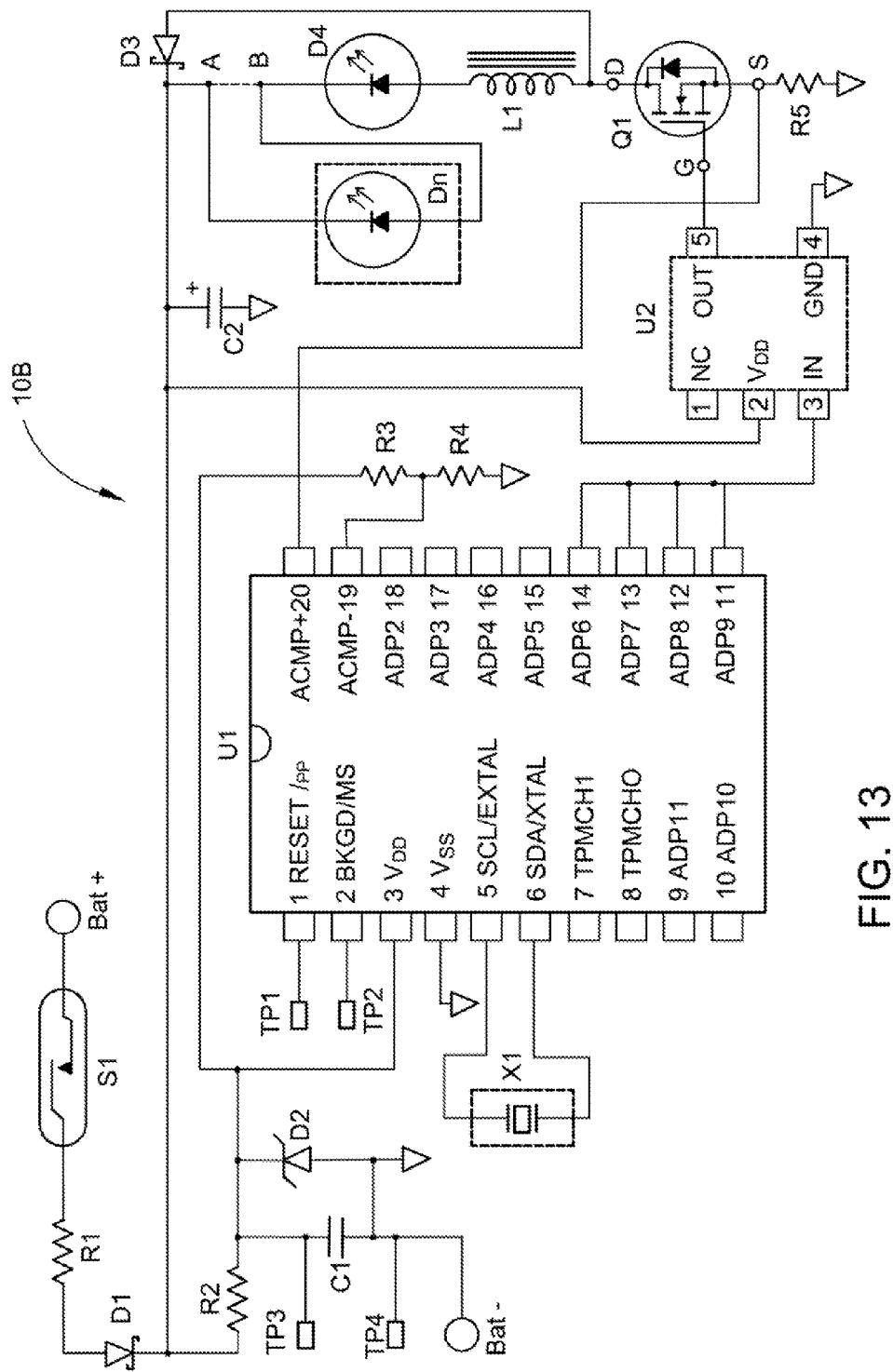
FIG. 13 depicts a similar schematic with multiple LED's.

FIG. 13 depicts a schematic for Visual Distress Signal Device 10B with similar characteristics except having the option of having multiple LED lights 65.

Figure 14:
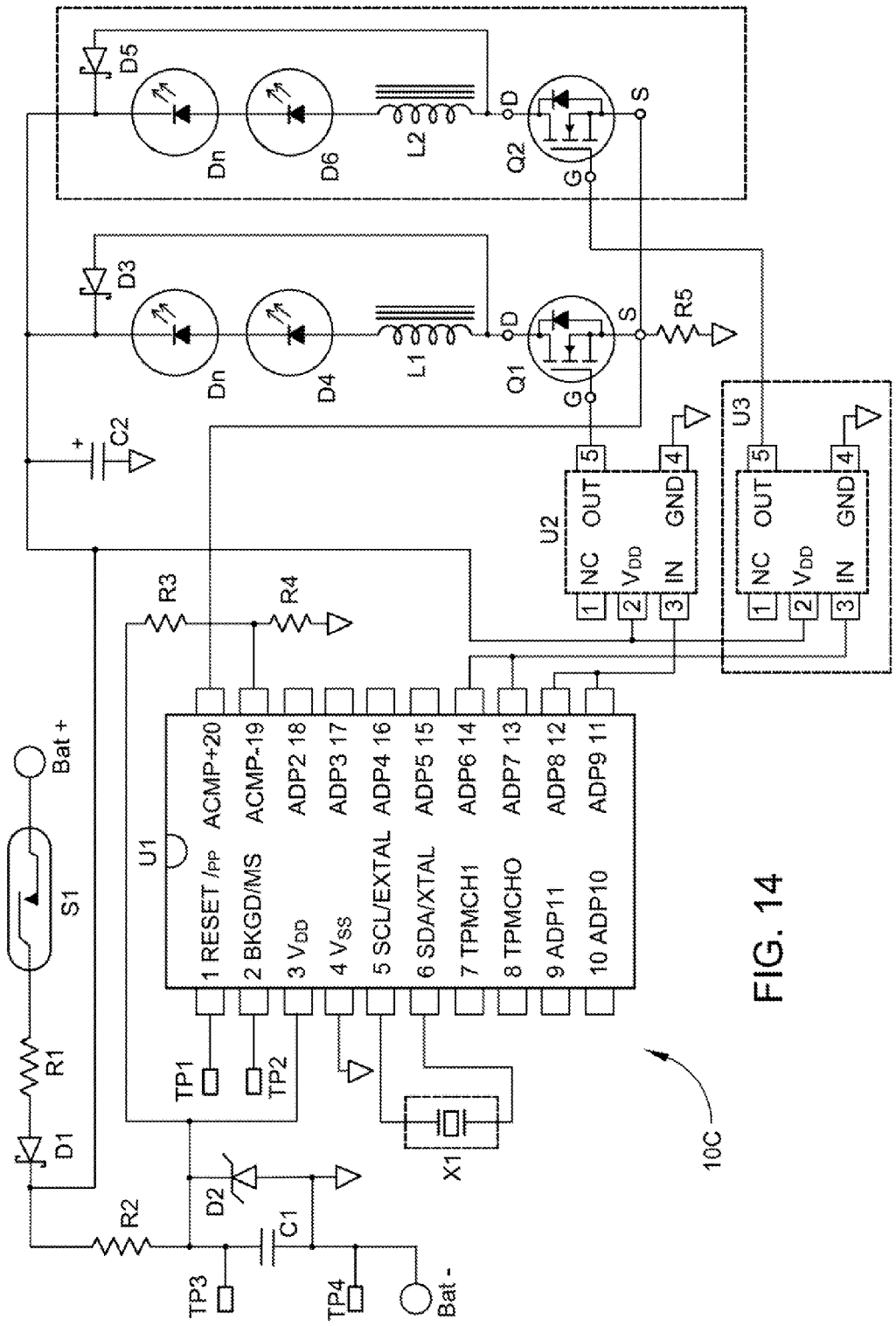
FIG. 14 depicts a similar schematic with multiple LED's and an embedded transmitter.

Referring now to FIG. 14, there is shown a similar schematic for Visual Distress Signal Device 10C with multiple LED's and an embedded beacon transmitter. A circuit controlled by a microcontroller or processor (U1) that is controlled by software. The circuit is energized by a power source supplied to Bat+ and Bat−. The circuit has inputs TP1 through TP4 that enable "In circuit programming". The power source is controlled by a switch. In this example, this is a reed switch (S1). R1 acts to limit the inrush current going to the storage capacitor (C2). Reverse power source protection is provided by (D1). Since the power source can be variable, the zener (D2) regulates the voltage supplying power to the microcontroller (U1). Frequency control is provided by a crystal (X1) in this example, but can be provided by any frequency regulating device. The output of the microprocessor controls a pass element, in this example a MOSFET (Q1), which is driven by a MOSFET Driver (U2). This pass element allows current to flow through a light emitting source, in this example an LED (D4), an inductor (L1), and a current sense element, in this example, a resistor (R5).

The light source can be a single element like an LED or multiple elements represented by "Dn" and placed in series illustrated by the dotted line trace. When Q1 is turned on, the current builds up a magnetic field in the inductor (L1) storing energy. When Q1 is turned off, L1 supplies current through D3, continuing to power the LED until the field in L1 collapses. The microcontroller senses the current, in this example by using an internal comparator (ACMP+ and ACMP−) to compare the voltage across R5 that represents the current, to a voltage supplied by a reference, in this example a voltage provided by a voltage divider R3 and R4. This controls the peak current.

Another embodiment would have multiple additional drivers and light sources, represented by the example additional circuit in the dotted box within for Visual Distress Signal Device 10C as shown in FIG. 14. This allows lighting separate light sources in different patterns and at different times.

The Algorithm for Visual Distress Signal Device 10C would function as follows: the switch is first turned on to power the circuit. Then Q1 is turned on. The current through the LED and inductor ramps up until the current through the current sense element matches the reference. Then Q1 is turned off and L1 continues to supply the current through D3 until its stored energy is exhausted. After some delay, Q1 is turned on again and the cycle repeats. This cycle repeats during the time the light source is intended to be on. Various patterns can be constructed by turning this cycle on and off. For example an S O S pattern for a marine beacon.

An additional embodiment would provide additional drivers allowing multiple circuits to use this algorithm independently.

Figure 15:
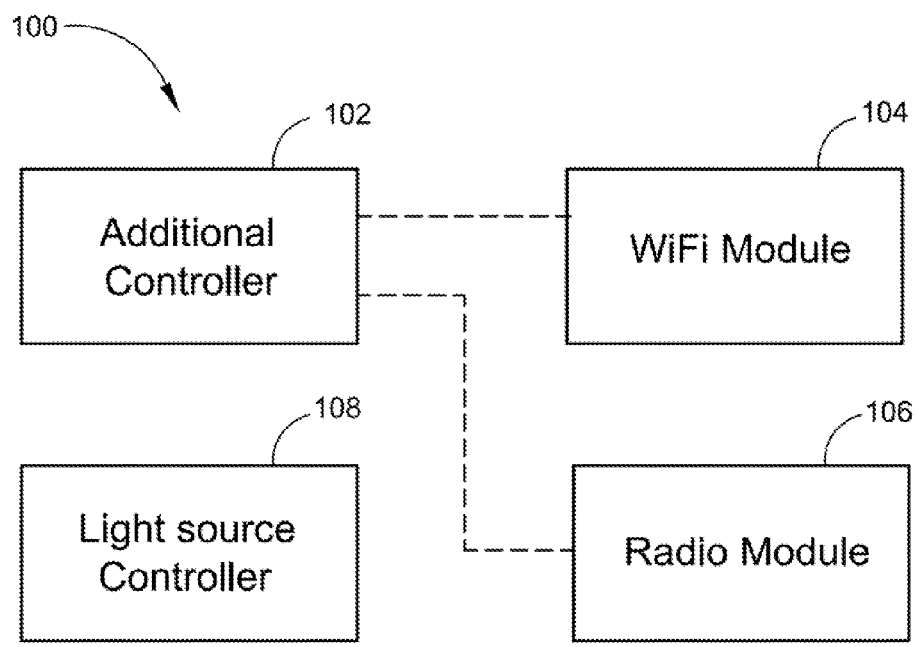
FIG. 15 depicts a communications flow diagram of an additional controller in communication with a global positioning system (GPS) transmitter utilizing Internet connectivity or a WiFi module and a radio module, with a light source controller present.

FIG. 15 depicts a communications flow diagram 100 of an additional controller in communication with a WiFi module and a radio module, with a light source controller present. An additional controller 102 is in communication with a WiFi module 104, and a radio module 106. A light source controller 108 is also present.

Figure 16:
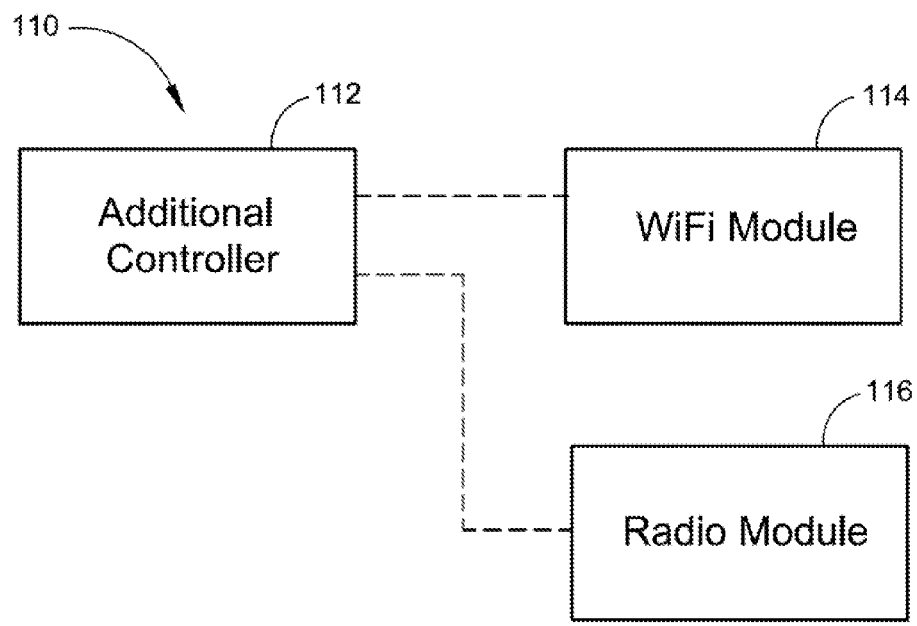
FIG. 16 depicts a communications flow diagram of an additional controller in communication with a GPS transmitter utilizing Internet connectivity or WiFi module and a radio module.

FIG. 16 depicts a communications flow diagram 110 of an additional controller in communication with a WiFi module and a radio module. An additional controller 112 is in communication with a WiFi module 114, and a radio module 116.

The alert system functions as follows: either an additional micro-controller or an enhanced version of the micro-controller that blinks the light source can be used to interface with an alert system. It can be interfaced with a WiFi Module such as a Freescale TWR-WIFI-AR4100 or a Radio Module such as a Maxim SKY77555 or a conventional transmitter circuit to transmit the information. The WiFi module could be setup as a WiFi hotspot with a web-page displaying an alert. Anyone in range looking for this hotspot would see the alert for example in a cellphone application. It could display the name of the vessel and the location for example. See FIGS. 15 and 16.

Another embodiment would allow the application to contact a server which monitors the GPS coordinates of its users. Users within an appropriate distance would be notified by text, email, or phone or any combination of these. See FIGS. 15 and 16.

A third embodiment would use a radio module to send out the alert or contact the Coast Guard. See FIGS. 15 and 16. Any combination of these could be used together. See FIGS. 15 and 16.

Figure 17:
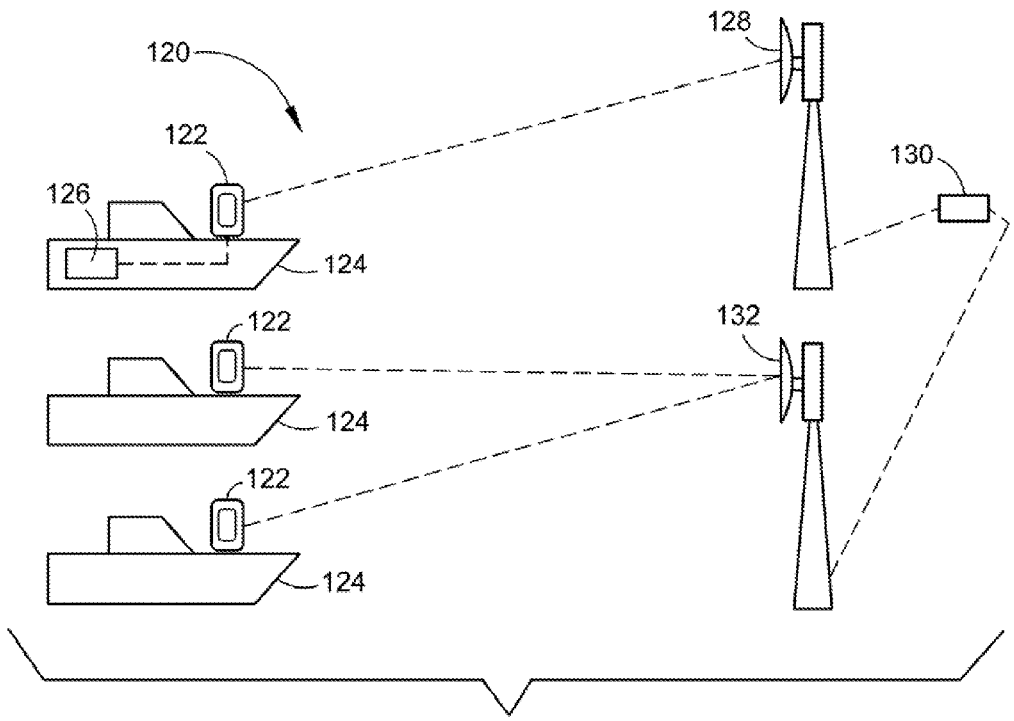
FIG. 17 depicts a communication system wherein a GPS device can interface with the Internet using a cell phone transmitter adaptor and mobile application software to provide a Visual Distress Signal Device unit which includes a PCB having an integrated electronic beacon with capability for GPS, cell phone, WiFi and Internet connectivity through a common server.

FIG. 17 depicts a communication system 120 wherein a GPS device can interface with the Internet using a cell phone transmitter adaptor with mobile application software 122 to provide a connected Visual Distress Signal Device unit 126 on board a vessel 124. The cell phone transmitter adaptor with mobile application software 122 connected Visual Distress Signal Device unit 126 includes a PCB having an integrated electronic beacon with capability for GPS, cell phone, WiFi and Internet connectivity through a common server 130 in communication with cell phone towers 128 and 132.

For enabling an Internet link, a unit with a GPS can interface with the Internet using a cell phone adaptor such as the ones available from most cell phone companies to connect to a laptop (see FIG. 17). The information describing the location and vessel identification can be sent to a server on the Internet. The server can compare the location of the vessel in distress with the database of locations of other vessels in the area. This database can be derived from the cell phones of users of the software application in the area. This software application would periodically transmit the location of the user's phone. The server would alert the vessels in the area by sending a text an alert in the software application on the phone, a text message, a phone call, an email, or some combination of them.

Figure 18:
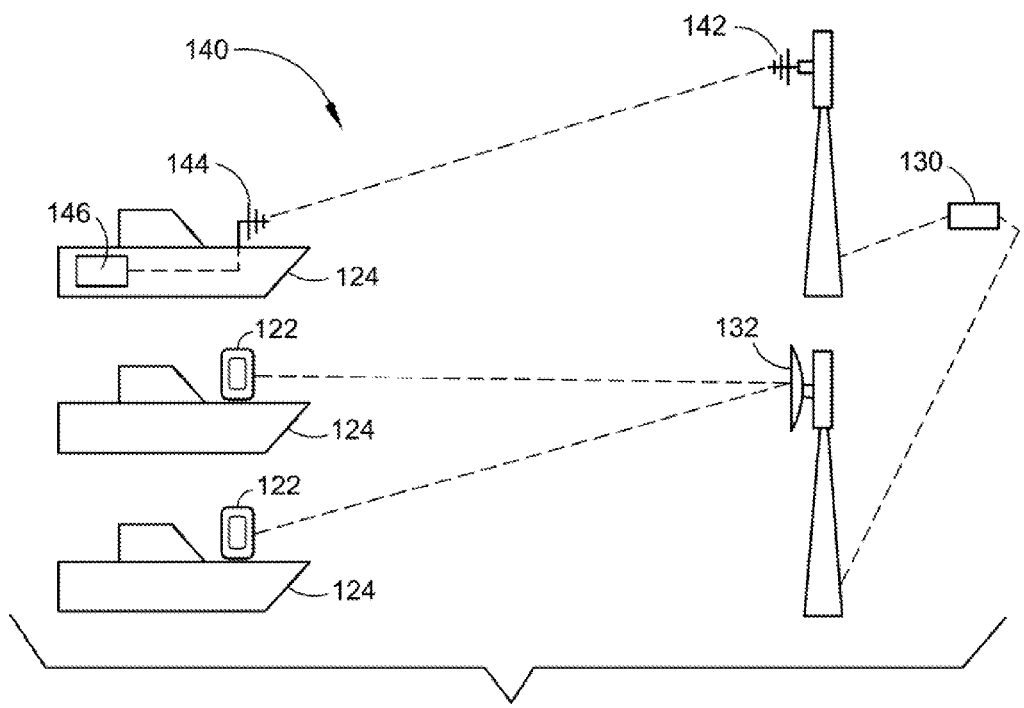
FIG. 18 depicts a communication system wherein a GPS device can interface with a radio transmitter to provide a Visual Distress Signal Device unit which includes a PCB having an integrated electronic beacon with capability for GPS, cell phone, WiFi and Internet connectivity through a common server.

FIG. 18 depicts a communication system 140 wherein a GPS device can interface with the Internet using a radio transmitter 144 to provide a connected Visual Distress Signal Device unit 146 on board a vessel 124. The radio transmitter 144 connected to the Visual Distress Signal Device unit 146 on board a vessel 124, includes a PCB having an integrated electronic beacon with capability for GPS, cell phone, WiFi and Internet connectivity through a common server 130 in communication with radio tower 142 and cell phone tower 132.

For enabling a radio link, a unit with a GPS can interface with the Internet using a radio transmitter (see FIG. 18). The information describing the location and vessel identification can be sent to a server on the Internet. The server can compare the location of the vessel in distress with the database of locations of other vessels in the area. This database can be derived from the cell phones of users of the software application in the area. This software application would periodically transmit the location of the user's phone. The server would alert the vessels in the area by sending a text an alert in the software mobile application on the phone, a text message, a phone call, an email, or some combination of them.

Another embodiment of the alert system anticipates a cellphone application. This application would present a web page to enter the vessel's information. The GPS present in the cellphone would pass the location information to the application. Periodically, this information would be sent by the cellphone via the internet to a central server. This would allow a program on the server to know the location of all of the cellphones using the application. A person on the vessel could activate the alert function of the application. The cellphone would send the alert to the server which would compare the location of the cellphone that issued the alert and the location of the other cell phones in the area. The server would relay the alert the alert to all of the cellphones using the application within a given radius of the cellphone that issued the alert.

Figure 19:
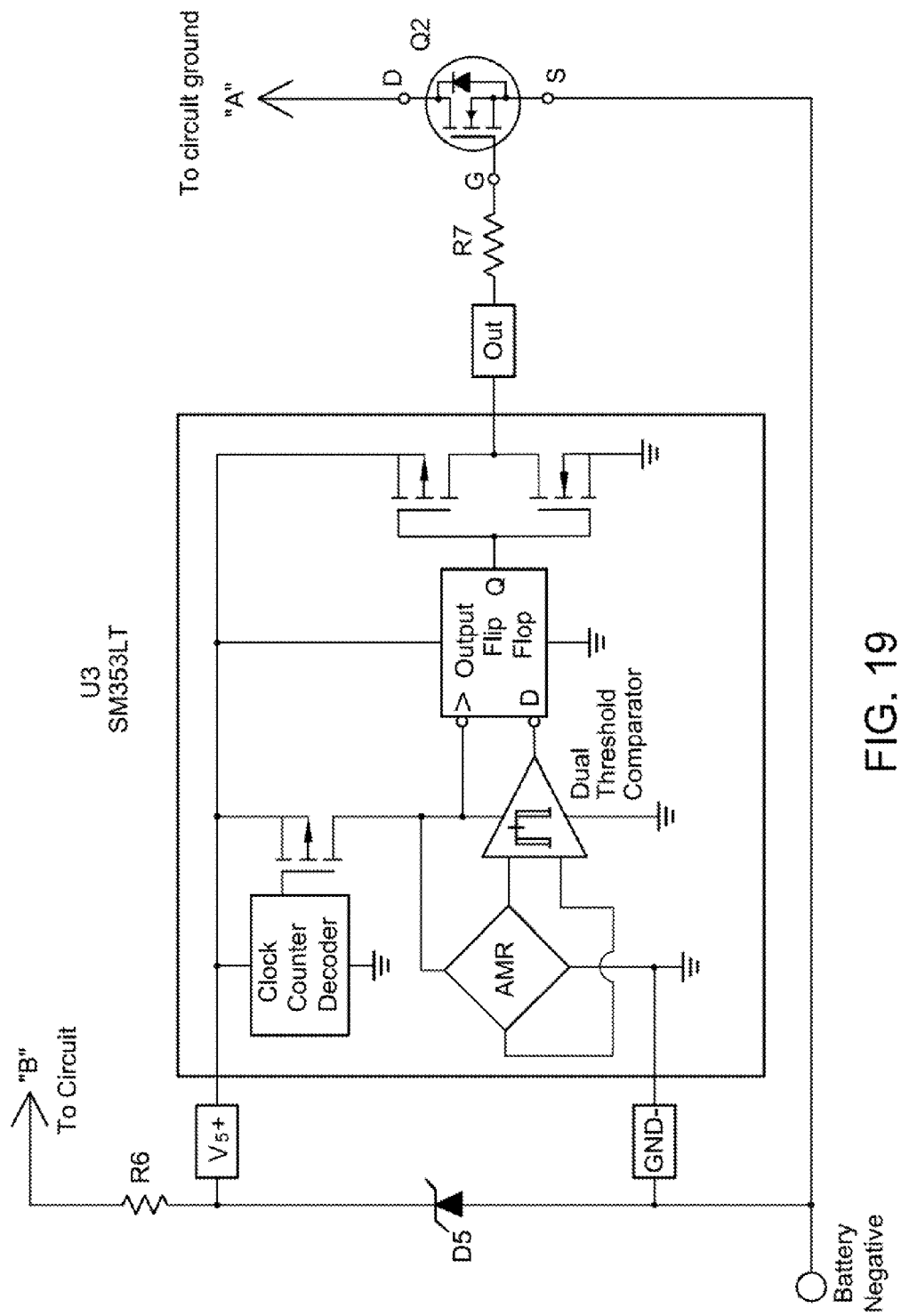
FIG. 19 depicts an alternate embodiment electronic version of the reed switch in the form of an SM353LT electronic switch, which is activated by a magnetic field.

Referring now to FIG. 19 there is illustrated an electronic version of the reed switch in the form of a SM353LT electronic switch which is activated by a magnetic field. This electronic version of the reed switch is wired to the schematic shown in FIG. 12 by way of the "A" point to the circuit ground, and the "B" to the circuit (see the "A" and the "B" points clearly shown in FIG. 12). The SM353LT is an off the shelf available electronic switch activated by a magnetic field. In an alternate embodiment, using the SM353LT, the magnet that would control the reed switch would instead control the SM353LT. D5 is a zener diode and regulates the voltage across U3. R6 limits the current to U3 and to the zener. U3 turns on when subjected to a magnetic field. This turns on Q2 through R7, a current limiting resistor. The rest of the circuit works as in the previous version.

The Visual Distress Signal Device 10A, 10B and 10C shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing a Visual Distress Signal Device 10 in accordance with the spirit of this disclosure, and such changes, alternations and modifications as would occur to those skilled in the art are considered to be within the scope of this design as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

We claim:

1. A visual distress signal device comprising:
    a floating waterproof housing having a watertight upper compartment and a floodable lower compartment;
    an electronically microcontroller controlled light source located within said watertight upper compartment, wherein said microcontroller is capable of controlling flashing of the light source at varying intervals, including in an S O S visual distress pattern;
    an optical lens having a conical upper reflective cavity located directly above said electronically controlled light source located within said watertight upper compartment wherein said optical lens is configured to refract light in a radially symmetrical pattern, and further wherein said optical lens is configured to refract three separate collimated beam light patterns including two separate horizontal 360 degree light patterns and a vertical light pattern of about 15 degrees and further wherein said optical lens is configured to refract light in a radially symmetrical pattern includes water shedding capability configured as drain slits and drain holes integrated into said optical lens;
    a power source located directly below said electronically microcontroller controlled light source located within said watertight upper compartment;
    wherein when activated the waterproof housing floats in an upright position with said upper compartment above said lower compartment and emits a light signal.

2. The visual distress signal device, according to claim 1, wherein said electronically microcontroller controlled light source located within said watertight upper compartment includes a printed circuit board (PCB) and one or more light emitting diodes (LEDs).

3. The visual distress signal device, according to claim 2, wherein said one or more light emitting diodes (LEDs) vary in color.

4. The visual distress signal device, according to claim 1, wherein said power source located directly below said electronically microcontroller controlled light source located within said watertight upper compartment includes a battery pack.

5. The visual distress signal device, according to claim 4, wherein said electronically controlled light source located within said watertight upper compartment includes a printed circuit board (PCB) and one or more light emitting diodes (LEDs) is mounted to and in electrical communication with said battery pack.

6. The visual distress signal device, according to claim 1, wherein said optical lens located directly above said electronically microcontroller controlled light source located within said watertight upper compartment includes a lens configured to refract light in a radially symmetrical pattern.

7. The visual distress signal device, according to claim 1, wherein said electronically microcontroller controlled light source located within said watertight upper compartment includes a PCB having an integrated electronic beacon.

8. The visual distress signal device, according to claim 7, wherein said integrated electronic beacon includes GPS, cell phone, WiFi and Internet connectivity.

9. The visual distress signal device, according to claim 7, wherein said integrated electronic beacon includes radio frequency connectivity.

10. The visual distress signal device, according to claim 1, wherein said electronically controlled light source is powered on and off using a magnetically activated reed switch, wherein said reed switch includes an electronic reed switch activated by a magnetic field.

11. The visual distress signal device, according to claim 1, wherein said floodable lower compartment is configured to contain emergency distress signaling equipment such as a distress flag and an emergency dye marker.

12. A method for making a visual distress signal device comprising the steps of:
    providing a floating waterproof housing having a watertight upper compartment and a floodable lower compartment;
    providing an electronically microcontroller controlled light source located within said watertight upper compartment, wherein said microcontroller is capable of controlling flashing of the light source at varying intervals, including in an S O S visual distress pattern;
    providing an optical lens having a conical upper reflective cavity located directly above said electronically controlled light source located within said watertight upper compartment wherein said optical lens is configured to refract light in a radially symmetrical pattern, and further wherein said optical lens is configured to refract three separate collimated beam light patterns including two separate horizontal 360 degree light patterns and a vertical light pattern of about 15 degrees and further wherein said optical lens is configured to refract light in a radially symmetrical pattern includes water shedding capability configured as drain slits and drain holes integrated into said optical lens;
    providing a power source located directly below said electronically microcontroller controlled light source located within said watertight upper compartment;
    wherein when activated the waterproof housing floats in an upright position with said upper compartment above said lower compartment and emits a light signal.

13. The method for making a visual distress signal device, according to claim 12, wherein said electronically microcontroller controlled light source located within said watertight upper compartment includes a printed circuit board (PCB) and one or more light emitting diodes (LEDs).

14. The method for making a visual distress signal device, according to claim 13, wherein said one or more light emitting diodes (LEDs) vary in color.

15. The method for making a visual distress signal device, according to claim 12, wherein said power source located directly below said electronically microcontroller controlled light source located within said watertight upper compartment includes a battery pack.

16. The method for making a visual distress signal device, according to claim 15, wherein said electronically microcontroller controlled light source located within said watertight upper compartment includes a printed circuit board (PCB) and one or more light emitting diodes (LEDs) is mounted to and in electrical communication with said battery pack.

17. The method for making a visual distress signal device, according to claim 12, wherein said optical lens located directly above said electronically microcontroller controlled light source located within said watertight upper compartment includes a lens configured to refract light in a radially symmetrical pattern.

18. The method for making a visual distress signal device, according to claim 12, wherein said electronically microcontroller controlled light source located within said watertight upper compartment includes a PCB having an integrated electronic beacon.

19. The method for making a visual distress signal device, according to claim 18, wherein said integrated electronic beacon includes GPS, cell phone, WiFi and Internet connectivity.

20. The method for making a visual distress signal device, according to claim 18, wherein said integrated electronic beacon includes radio frequency connectivity.

21. The method for making a visual distress signal device, according to claim 12, wherein said electronically controlled light source is powered on and off using a magnetically activated reed switch, wherein said reed switch includes an electronic reed switch activated by a magnetic field.

22. The visual distress signal device, according to claim 12, wherein said floodable lower compartment is configured to contain emergency distress signaling equipment such as a distress flag and an emergency dye marker.

* * * * *